(12) United States Patent
Kanemaru et al.

(10) Patent No.: US 7,529,164 B2
(45) Date of Patent: May 5, 2009

(54) RECORDING AND REPRODUCING APPARATUS AND RECEIVING APPARATUS

(75) Inventors: Takashi Kanemaru, Yokohama (JP); Sadao Tsuruga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 588 days.

(21) Appl. No.: 11/367,457

(22) Filed: Mar. 6, 2006

(65) Prior Publication Data

US 2006/0285822 A1 Dec. 21, 2006

(51) Int. Cl.
  *G11B 20/10* (2006.01)
  *H04N 7/00* (2006.01)

(52) U.S. Cl. .................. 369/47.28; 369/47.16; 386/96

(58) Field of Classification Search .................. None
See application file for complete search history.

(56) References Cited

U.S. PATENT DOCUMENTS

| | | | |
|---|---|---|---|
| 5,502,573 A * | 3/1996 | Fujinami | 386/65 |
| 5,537,148 A * | 7/1996 | Fujinami | 348/473 |
| 6,345,079 B1 | 2/2002 | Ohishi | |
| 6,477,204 B1 * | 11/2002 | Fukushima et al. | 375/240.28 |
| 7,326,838 B1 * | 2/2008 | Bunker | 84/293 |
| 2004/0062334 A1 * | 4/2004 | Poon | 375/376 |
| 2004/0109519 A1 * | 6/2004 | Mizukami et al. | 375/362 |

FOREIGN PATENT DOCUMENTS

| JP | 10-011902 | | 1/1998 |
|---|---|---|---|
| JP | 11261545 A | * | 9/1999 |
| JP | 2002-015527 | | 1/2002 |
| JP | 2004-040709 | | 2/2004 |

* cited by examiner

*Primary Examiner*—Thang V Tran
(74) *Attorney, Agent, or Firm*—Antonelli, Terry, Stout & Kraus, LLP.

(57) ABSTRACT

Where a clock frequency based on which encoding is performed has deviated over time, problems such as that an appropriate digital signal can not be outputted occur. To solve the problems, it is arranged such that when a decoder decodes video data and audio data, a control variable for controlling a frequency of a clock recovered by a clock generating portion is recorded as needed in a recording portion, and when the decoder decodes data recorded in the recording portion, the clock generating portion is controlled by using the control variable so that system time information generated by the counter synchronizes with time information extracted upon reception of a digital broadcasting program.

6 Claims, 6 Drawing Sheets

RECORDING AND REPRODUCING APPARATUS AND RECEIVING APPARATUS

BACKGROUND OF THE INVENTION

The present invention relates to a transport stream recording and reproducing apparatus and a method of reproducing a transport stream.

Among the MPEG (Moving Picture Experts Group) standards that are international standards, there is the MPEG-2 standard to be applied to communications systems and broadcasting systems. One of specific forms of MPEG-2 systems is the MPEG-2 Transport Stream (which will be abbreviated as MPEG2-TS) suitable for storage or transmission in environments where errors are likely. According to the MPEG2-TS, a PCR (Program Clock Reference) as a time information value is forwarded by multiplexing, so that a receiving apparatus can reproduce video and audio in synchronization as intended by a transmitter, by referencing the PCR.

JP-A-10-11902 discloses a technique to obtain a system clock phase-locked with the PCR, by supplying an oscillator a control signal based on frequency information recorded in a memory upon recording of a program, and having the oscillator generate a system clock based on the control signal.

SUMMARY OF THE INVENTION

To clarify description of the invention, there will be first described briefly an operation to receive and reproduce a digital broadcasting program by a receiving apparatus.

Initially, a PAT (Program Association Table) and a PMT (Program Map Table) are extracted from an inputted TS (Transport Stream), and PIDs (Packet IDs) related to the program of interest are determined. TS packets with the determined PIDs are extracted, and data of the packets is separated into video, audio, and PCR.

Then, the value of the received PCR is set as an initial value of a count of a STC (System Time Clock) counter, and the STC counter thereafter counts up. At a timing when a DTS (Decoding Time Stamp) accompanying each packet of video data coincides with the count, video data of that packet is decoded. At a timing when a PTS (Presentation Time Stamp) accompanying each packet of video or audio data coincides with the count, video or audio data of that packet is presented.

The frequency at which the STC counter counts is defined by the MPEG2-TS standard to be 27 MHz±30 ppm. To control the increase rate of the count of the STC counter, a PWM (Pulse Width Modulator) control maybe employed, where the STC counter counts at a frequency based on clock pulses generated by an oscillator, that is, the STC counter counts at a frequency of 27 MHz that is a divisor of 54 MHz that is a frequency of the clock pulses generated by the oscillator, for instance. In the PWM control, there is made a comparison between the value of the PCR that is periodically received, and the count of the STC counter, and a pulse width or an interval of output pulses of the oscillator is adjusted in order to eliminate or decrease an obtained error therebetween. Where signals of a plurality of digital broadcasting programs are received, one of a plurality of PCRs for the respective programs is selected to be referenced in the PWM control. Thus, when receiving a digital broadcasting program, a stable clock recovery is enabled by referencing the PCR.

On the other hand, when a digital broadcasting program is reproduced from a recording medium, the reproduction may be performed with intervals of transmission of packets not made even. For instance, there is a reproduction method (which will be referred to as "flow controlled reproduction") where a decoder controls data transmission from a recording medium depending on a decode capability of the decoder. In this method, an input of a stream to the decoder is performed irrespective of the PCR, and thus it is impossible to perform the clock recovery by referencing the PCR. Hence, in the case where the flow controlled reproduction is implemented, or where it can not be expected that the PCR obtained is accurate, the system performs the clock recovery by using a constant set value. However, the thus generated frequency differs from an apparatus to apparatus due to design error of circuitry, characteristics of the oscillator, and others, or deviates from 27 MHz each time reproduction is implemented. When an amount of the difference or the deviation is such that the generated frequency falls within the range of 27 MHz±30 ppm as defined by the MPEG-2 standard, reproduction is performed without problems. When the difference or deviation is large and the generated frequency falls outside the range defined by the MPEG-2 standard, there occur problems such as buffer overflow or underflow during reproduction for a longtime, and NTSC signals incapable of being correctly outputted.

In a digital broadcast signals recording and reproducing apparatus that includes an encoder and makes an output to an external recording apparatus such as that of D-VHS, when a clock frequency based on which encode processing is performed differs or deviates, problems such as digital signals incapable of being correctly outputted occur, similarly to the case of the reproduction from a recording medium as described above.

Therefore, there is requested a control method for stably recovering a clock when reproduction from a recording medium is implemented, or when encoding is performed.

In the technique disclosed in the above-mentioned publication, the oscillator is supplied with the control signal based on the frequency information recorded in the memory upon recording of the program in order that the oscillator generates the system clock based on the frequency information. According to this technique, the frequency information recorded in the memory is fixed after once recorded. Thus, where the flock frequency based on which encoding is performed comes to deviate due to aging of the apparatus or for other reasons after a predetermined time, the above-described problems such as digital signals not appropriately outputted occur. That is, change of a device over time is not sufficiently considered.

An object of this invention is, therefore, to provide a recording and reproducing apparatus capable of a stable clock recovery irrespective a lapse in time.

To attain the above object, an embodiment of the invention provides a mechanism to enable to update the frequency information as needed. That is, the embodiment provides a recording and reproducing apparatus comprising:

a receiving portion that receives broadcast data;

an extracting portion that extracts video data, audio data, and time information from the broadcast data;

a counting portion that generates system time information from the time information;

a clock generating portion that generates a clock signal in accordance with which the counting portion is operated;

a decoding portion that decodes, using the clock signal generated by the clock generating portion, the video data and the audio data that are extracted by the extracting portion;

a recording portion that records the broadcast data; and a control portion that operates to record, as needed and in the recording portion, a control variable based on which a frequency of the clock signal generated by the clock generating portion is controlled when the decoding portion decodes the video data and the audio data, and to control the clock generating portion by using the control variable so that the system time information generated by the counting portion synchronizes with the time information as extracted upon reception of the broadcast data.

According to this arrangement, when a program is reproduced from a recording medium, the control value or set value can be properly set, as needed, by taking account of the deviation unique to each apparatus due to circuitry design or others, or the deviation due to there production environments, thereby enabling a stable clock recovery irrespective of a lapse of time.

Thus, the embodiment of the invention can provide a recording and reproducing apparatus capable of a stable clock recovery.

DETAILED DESCRIPTION OF THE PREFERRED EMBODIMENT

Hereinafter, there will be described several presently preferred embodiments of the invention, in each of which the invention is applied to an apparatus for receiving a stream in the format of MPEG2-TS currently employed in broadcasting, and recording and reproducing the stream on and from a recording medium. However, it is to be understood that the embodiments are described only by way of example and the scope of the invention is not limited to the details of the embodiments.

Figure 2:
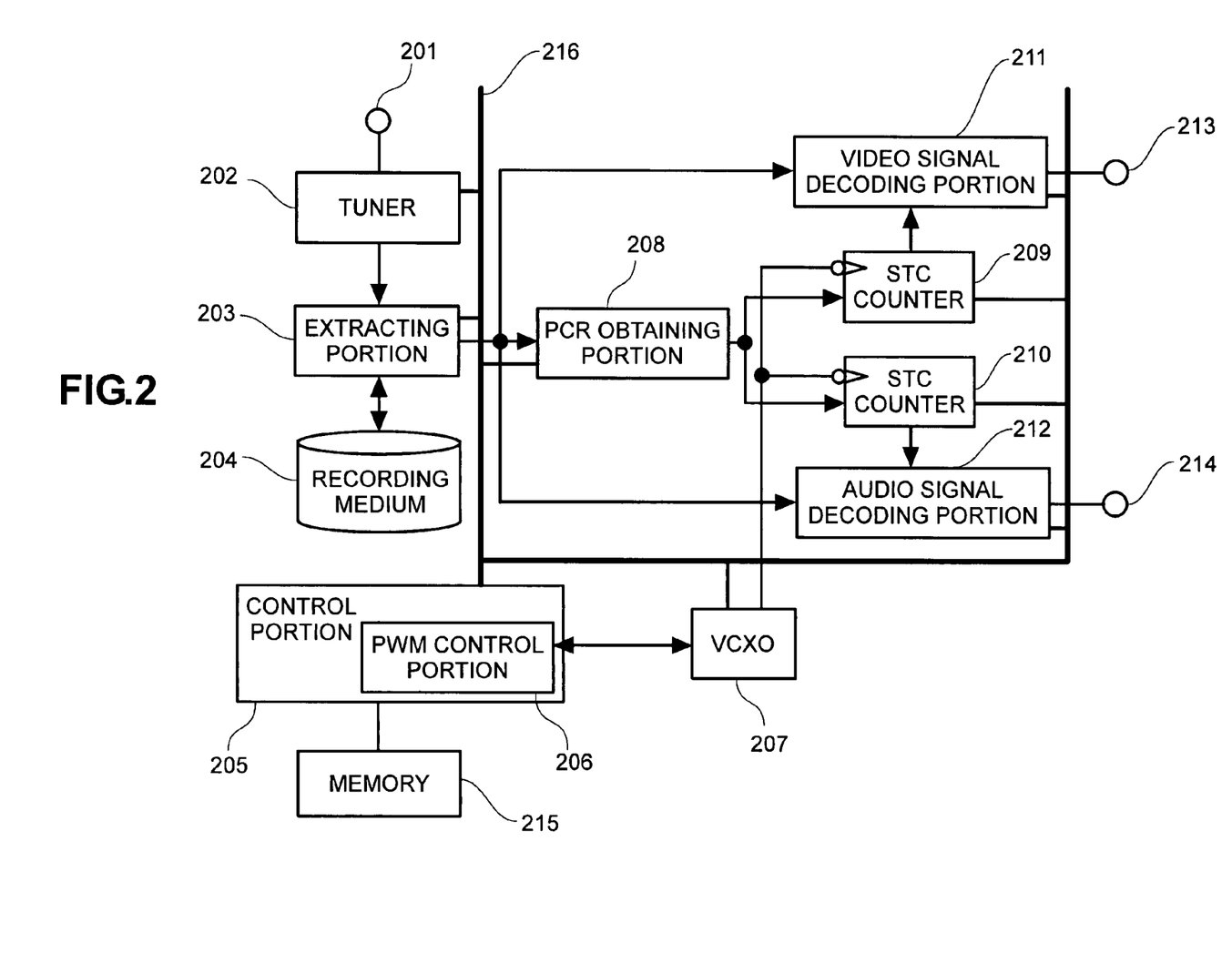
FIG. 2 is a functional block diagram of a recording and reproducing apparatus according to the first embodiment.

Referring first to FIG. 2, there is shown a structure of a digital broadcasting program recording and reproducing apparatus according to a first embodiment. The digital broadcasting program recording and reproducing apparatus includes an input terminal 201, a tuner 202, an extracting portion 203, a recording medium 204, a control portion 205, a PWM control portion 206, a VCXO (Voltage Controlled CRYSTal Oscillator) 207, a PCR obtaining portion 208, a STC counter 209, a STC counter 210, a video signal decoding portion 211, an audio signal decoding portion 212, an output terminal 213, an output terminal decoding portion 601, a memory 215, and a system bus 216.

More specifically, the input terminal 201 is a terminal from which a digital broadcast signals transferred in the MPEG2-TS format is inputted. The tuner 202 receives or tunes in an input broadcast signals. The extracting portion 203 extracts only necessary data from the digital broadcast signals transferred from the tuner 202, and outputs the extracted data to a recording medium 204. Alternatively, the extracting portion 203 extracts video data, audio data, and time information from the digital broadcast signals, and outputs the video data, the audio data, and the time information to the video signal decoding portion 211, the audio signal decoding portion 212, and the PCR obtaining portion 208, respectively. Digital signals transferred from the recording medium 204 are also subjected to the extraction by the extracting portion 203, namely, video data, audio data, and time information are extracted therefrom to be outputted to the video signal decoding portion 211, the audio signal decoding portion 212, and the PCR obtaining portion 208, respectively. The recording medium 204 is a medium on and from which digital broadcast signals are recorded and reproduced, and which deals data in the MPEG2-TS format employed in digital broadcasting.

The control portion 205 controls operation of the recording and reproducing apparatus. That is, the control portion 205 receives a PCR from the PCR obtaining portion 208, and makes a comparison between the PCR and a count of the STC counter 209/210. The control portion 205 sends a control signal to the PWM control portion 206 based on a result of the comparison, or alternatively, the control portion 205 directly controls the value set with respect to the VCXO 207 based on the result of the comparison.

The PWM control portion 206 includes a comparator that makes the comparison between the PCR and the count of the STC counter 209/210, and a D/A for converting the result of the comparison into a direct current. The PWM control portion 206 cooperates with the VCXO 207 to constitute a PLL (Phase Locked Loop), and controls the VCXO 207 such that an error between the PCR and the count of the STC counter 209/210 is eliminated or decreased when a digital broadcasting program is received.

The VCXO 207 generates and outputs clock pulses to the STC counter 209, 210 in order to operate the STC counter 209, 210 in synchronization with the clock pulses. A pulse width of the clock pulses is controlled by the PWM control portion 206 or the control portion 205.

The PCR obtaining portion 208 receives the PCR as time information from the extracting portion 203, and sets the count of the STC counter 209/210 of the following stage at the value of the PCR and at the same time transfers the PCR to the control portion 205 via the system bus 215.

In other words, the STC counter 209/210 supplied with the PCR from the PCR obtaining portion 208 sets the value of the PCR as its count. The count of the STC counter 209/210 is incremented by referencing the clock generated by the VCXO 207. The count is supplied to the video signal decoding portion 211 as needed.

The count of the STC counter 210 is incremented in the same way as the STC counter 209, and supplied as needed to the audio signal decoding portion 212.

The video signal decoding portion 211 decodes and outputs the video data or signals transferred from the extracting portion 203. At a timing when the count of the STC counter 209 sent therefrom and a DTS accompanying a video signal coincide, decoding of the signal is performed. At a timing when the count and a PTS as time information coincide, the decoded video signal is outputted to the output terminal 213.

The audio signal decoding portion 212 decodes and outputs the audio data or signals transferred from the extracting portion 203. At a timing when the count of the STC counter 210 and a PTS as time information accompanying an audio signal coincide, decoding of the audio signal is performed, and the decoded signal is outputted to the output terminal decoding portion 601. The output terminals 213 and decoding portion 601 are terminals from which the decoded video and audio data are outputted, respectively. The memory 215 stores a set value or a control variable described later. The system bus 216 is for communication of instruction and data among the control portion 205 and the functional blocks 202, 203, 205, 207-212.

In the thus constructed digital broadcasting program recording and reproducing apparatus, the digital broadcast signals inputted from the input terminal 204, or the digital signals recorded in the recording medium 204, are outputted with the video and the audio synchronized with each other.

When a digital broadcasting program is received, a PWM control is implemented as described below, in order to stably operates the STC counter 209/210.

Figure 3:
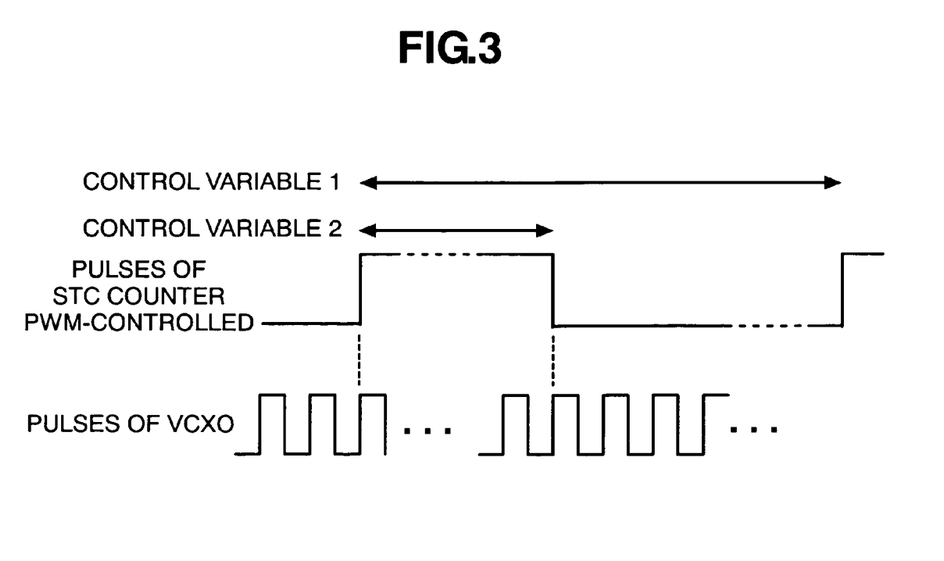
FIG. 3 is a diagram of a pulse form of the STC counter according to a PWM control in the first embodiment.

For instance, as shown in FIG. 3, the PWM control portion 206 can control the pulse width and interval of the clock pulses of the VCXO 207 such that the frequency of a system clock generated by the VCXO is a multiple of that of the STC counter 209/210. The frequency of the VCXO 207 is made 54 MHz in order to in turn make the frequency of the STC counter 209/210 substantially at 27 MHz.

When this apparatus receives a digital broadcasting program, the PWM control portion 206 controls the STC counter 209/210. Having tuned in on a station, the PCR obtaining portion 208 transfers the PCR to the control portion 205, and the STC counter 209/210 transfers its/their count(s) to the control portion 205. The control portion 205 compares the PCR to (each of) the count(s) to obtain a difference therebetween, and transfers a control signal based on the difference to the PWM control portion 206. In accordance with the control signal, the PWM control portion 206 changes the set value or control variable in order that the difference between the count and the PCR is eliminated or decreased. That is, a single control variable or a plurality of control variables that can determine an output of the VXXO 207 to a unique value, such as a voltage to be applied to the VCXO 207 and/or frequency information, are used as a set value.

When a result of the comparison indicates that the PCR is larger than the count of the STC counter, the PWM control portion 206 changes the set value in order to decrease the pulse width of the output pulses of the VCXO 207. On the other hand, when the result of the comparison indicates that the PCR is smaller than the count of the STC counter, the PWM control portion 206 changes the set value in order to increase the pulse width of the output pulses of the VCXO 207. By iterating the above process, the STC counters 209, 210 stably operate at a frequency locked with the PCR received, after a certain time has elapsed.

When the input to the apparatus is interrupted due to re-tuning in on a station by a user, the obtaining of the PCR becomes unavailable, thereby making the pulse width of the VCXO as controlled by the PWM control indeterminate. When the re-tuning in is complete and a stream is newly inputted, referencing the PCR is resumed and the PWM control portion 206 operates to have the frequency of the VCXO 207 and that of the STC counter 209/210 as close as possible to each other, or coincident with each other.

Figure 4:
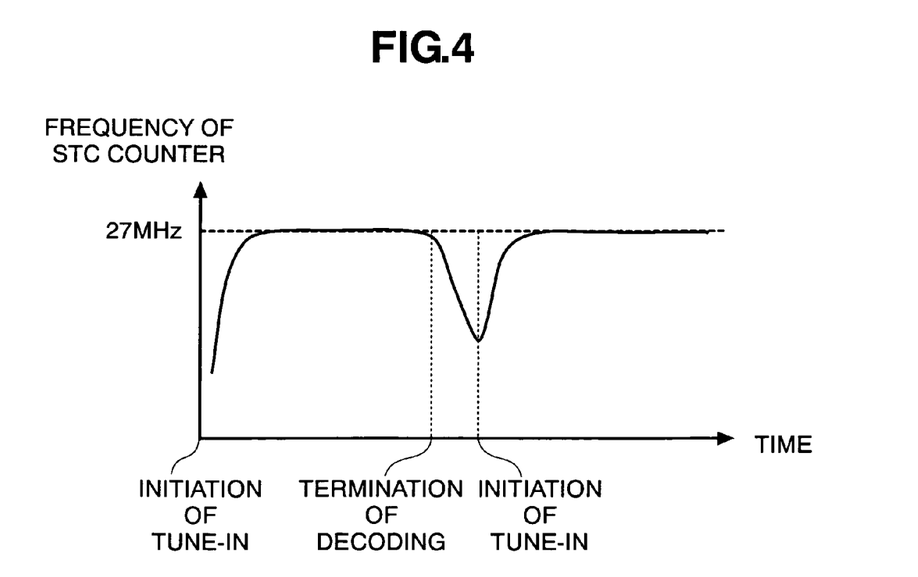
FIG. 4 is a diagram illustrating change in the frequency of the STC counter in the PWM control when a digital broadcasting program is received.

That is, as shown in FIG. 4, when a broadcast wave is received, the STC counter 209/210 stably operates asymptotically at frequencies near 27 MHz that is an ideal value, with a fluctuation around the timing of the re-tuning in and decode completion, for instance.

The value of each of the at least one control variable that makes the STC counter 209/210 to stably operate at a frequency or frequencies within the range defined by the MPEG-2 standard is to be recorded. The recorded value is not fixed, but the control portion 205 updates the value to an optimum value as needed. More specifically, even after the control variable is once recorded, each time a broadcast program is received, the control portion 205 obtains the value that makes the frequency of the STC counter 209/210 stable in the defined range, and updates the control variable as currently recorded in the memory 215 to the newly obtained value. In this way, the optimum value of the control variable can be obtained as needed.

There will be now described a method of stably recover a clock when recorded digital signals are reproduced from the recording medium 204. Briefly described, the method is:

1. The value of the control variable that makes the STC counter to stably operate at the frequency or frequencies within the range defined by the MPEG-2 standard when a digital broadcasting program is received is recorded in the digital broadcasting program recording and reproducing apparatus.
2. Thereafter, the VCXO 207 is controlled using the recorded value of the control variable in order to stabilize the clock recovery.

First, there will be described a way of obtaining the value of the control variable when the operation of the STC counter is stabilized upon reception of a digital broadcasting program.

Figure 1:
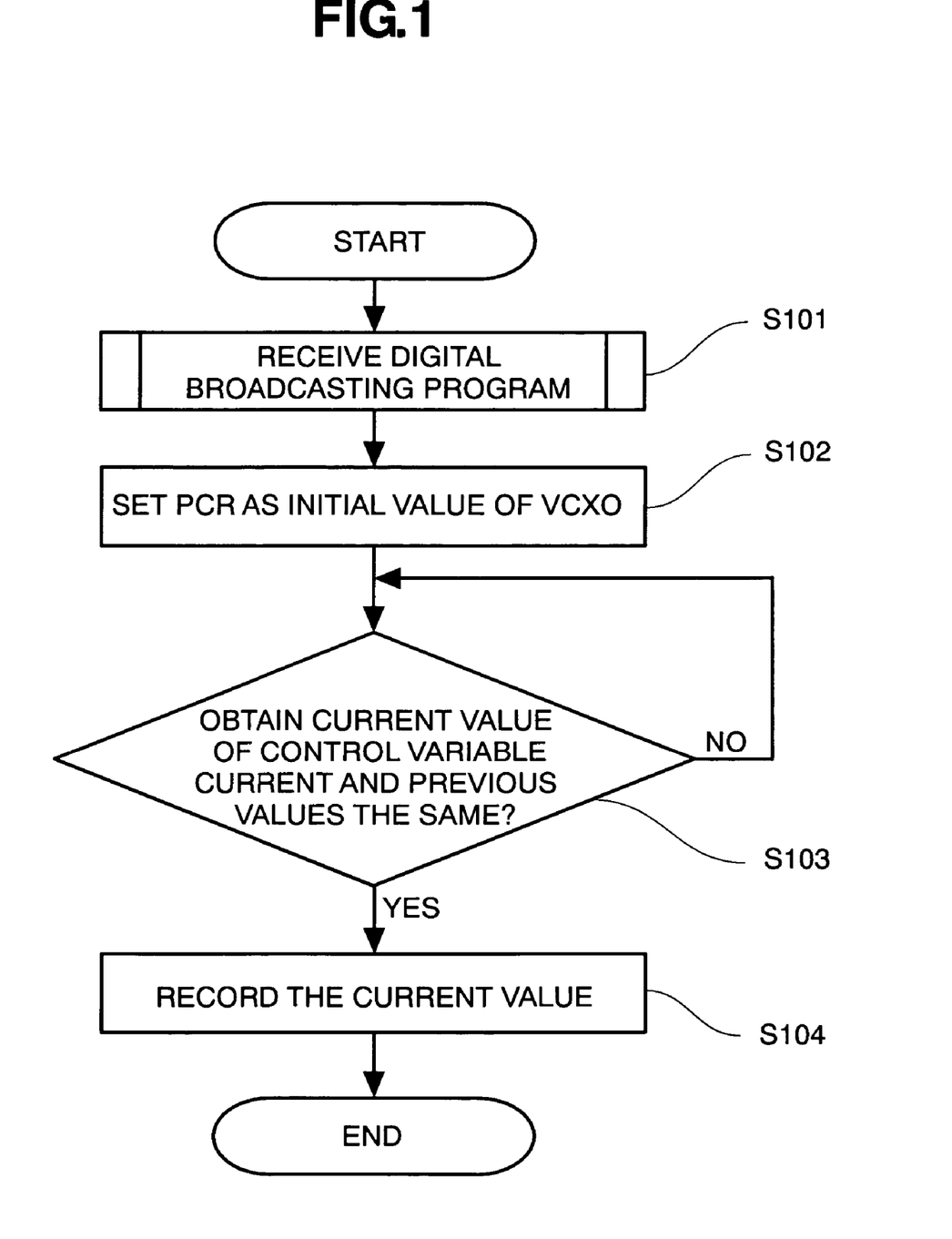
FIG. 1 is a flowchart illustrating an example of a way of obtaining a value of a control variable that makes a STC counter to stably operate at a frequency within a range defined by the MPEG-2 standard, according to a first embodiment of the invention.

FIG. 1 illustrates an example of an operation to obtain the value of each of the at least one control variable when the operation of the STC counter is stabilized upon reception of a digital broadcasting program.

A flow of the operation begins with step S101 to receive a digital broadcasting program, and the flow goes to step S102 in which the initial value to be assigned to the VCXO 207 is determined, and the flow goes to step S103. Thereafter, a PLL circuit constituted by the PWM control portion 206 and the VCXO 207 operates to update the control variable each time a PCR is received, in order to ultimately obtain a system clock without phase difference from the PCR. In step S103, after a predetermined time has elapsed, the current value of the control variable is obtained to be compared with the previous value thereof. When a result of the comparison indicates that the current and previous values are the same, it is determined that a stable system clock is obtained and the flow goes to step S104. When the result of the comparison indicates that the current and previous values differ from each other, the flow goes to a loop of repeating step S103. In step S104, the control portion 205 operates to record the value as obtained in step S103 at the predetermined variable in the memory 215, and permit reproduction from the recording medium 204, and the flow of this cycle terminates therewith.

With regard to setting of the predetermined time of which elapse is waited for in step S104, when the predetermined time is relatively long, the value of the variable at which the frequency of the STC counter is stable is accordingly reliably obtained, but a relatively long time is taken to obtain such a value. Hence, the predetermined time should be appropriately set. The way of obtaining the value of the variable at which the frequency of the STC counter is stable may be modified such that when the same value is repeatedly detected a predetermined number of times consecutively, with the predetermined time set to be relatively short, the value is recorded.

By iterating the above-described operation to obtain the value of the control variable a plurality of times as described below, there is obtained a value of the control variable which enables a clock recovery that stabilizes reproduction from the recording medium 204 irrespectively of the change in the oscillating frequency of the oscillating element.

EXAMPLE 1

Each time a value of the control variable that makes the frequency of the STC counter stable within the defined range is successfully obtained upon reception of a broadcast wave, the control variable recorded in the memory 215 is updated to that value. When reproduction from the recording medium 204 is implemented, the value of the control variable currently recorded is used in the clock recovery. This enables a clock recovery not influenced by the temperature characteristics, and change over time, of the oscillator. As an example where the embodiment is broadened, it may be arranged such that a plurality of values of the control variable that make the frequency of the STC counter stable are recorded in the memory 215, and when production is implemented, a value of the control variable used for the clock recovery is obtained by obtaining an average of the values or other calculations.

EXAMPLE 2

A value of the control variable is recorded, for each channel, in the memory 215. When a value that makes the frequency of the STC counter stable can be obtained upon reception of a broadcast program, the control variable is updated for a channel corresponding to the broadcast program to that value. When reproduction from the recording medium 204 is implemented, the channel corresponding to the program to be reproduced is identified, and the value of the control variable for that channel is used in the clock recovery. This enables a clock recovery adapted to an encoder of a broadcast station.

In either of Examples 1 and 2, the place where the value detected is recorded may be the recording medium 204.

Figure 5:
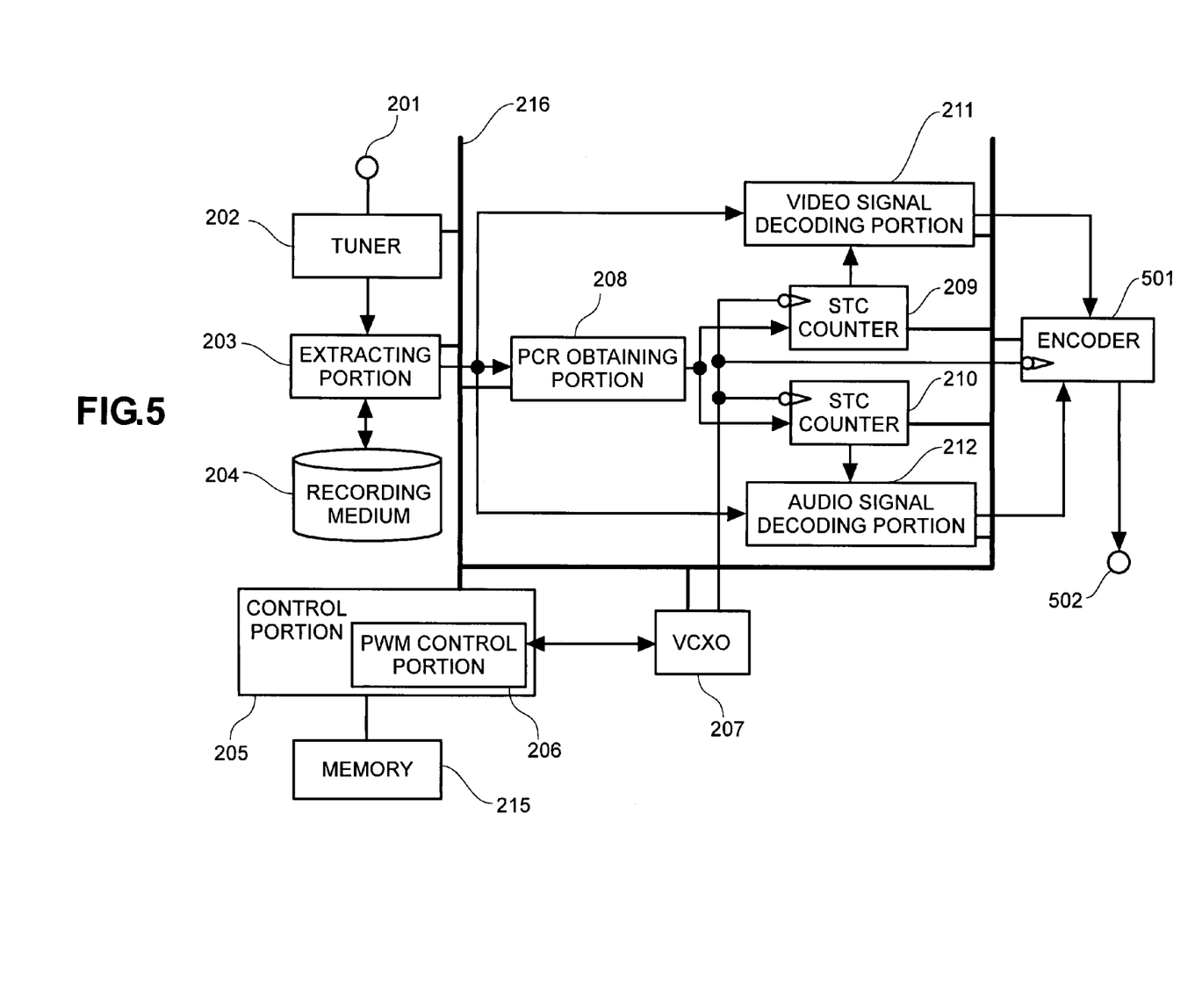
FIG. 5 is a functional block diagram of a recording and reproducing apparatus including an encoder, according to a second embodiment of the invention.

Referring next to FIG. 5, there will be described a digital broadcasting program recording and reproducing apparatus according to a second embodiment, that is obtained by adding an encoder to the digital broadcasting program recording and reproducing apparatus of the first embodiment show in FIG. 2.

The encoder 501 receives video signals decoded at a video signal decoding portion 211, and audio signals decoded at an audio signal decoding portion 212, encodes the received signals based on clock signals outputted from the VCXO 207, and outputs the encoded signals to an output terminal 502.

The output terminal 502 is connected to an external device such as that of D-VHS. The data encoded at the encoder 501 is outputted to the output terminal 502.

In the digital broadcast receiving (or recording and reproducing) apparatus, the encoder 501 can encode the data stably, by controlling the VCXO 207 using the value of the control variable that makes the frequency of a STC counter 209/210 stable and that can be obtained as described above with respect to the first embodiment, in the same way as in the case of reproduction from the recording medium 204. The way of recording and reading the value of the control variable is identical with that of the first embodiment.

Figure 6:
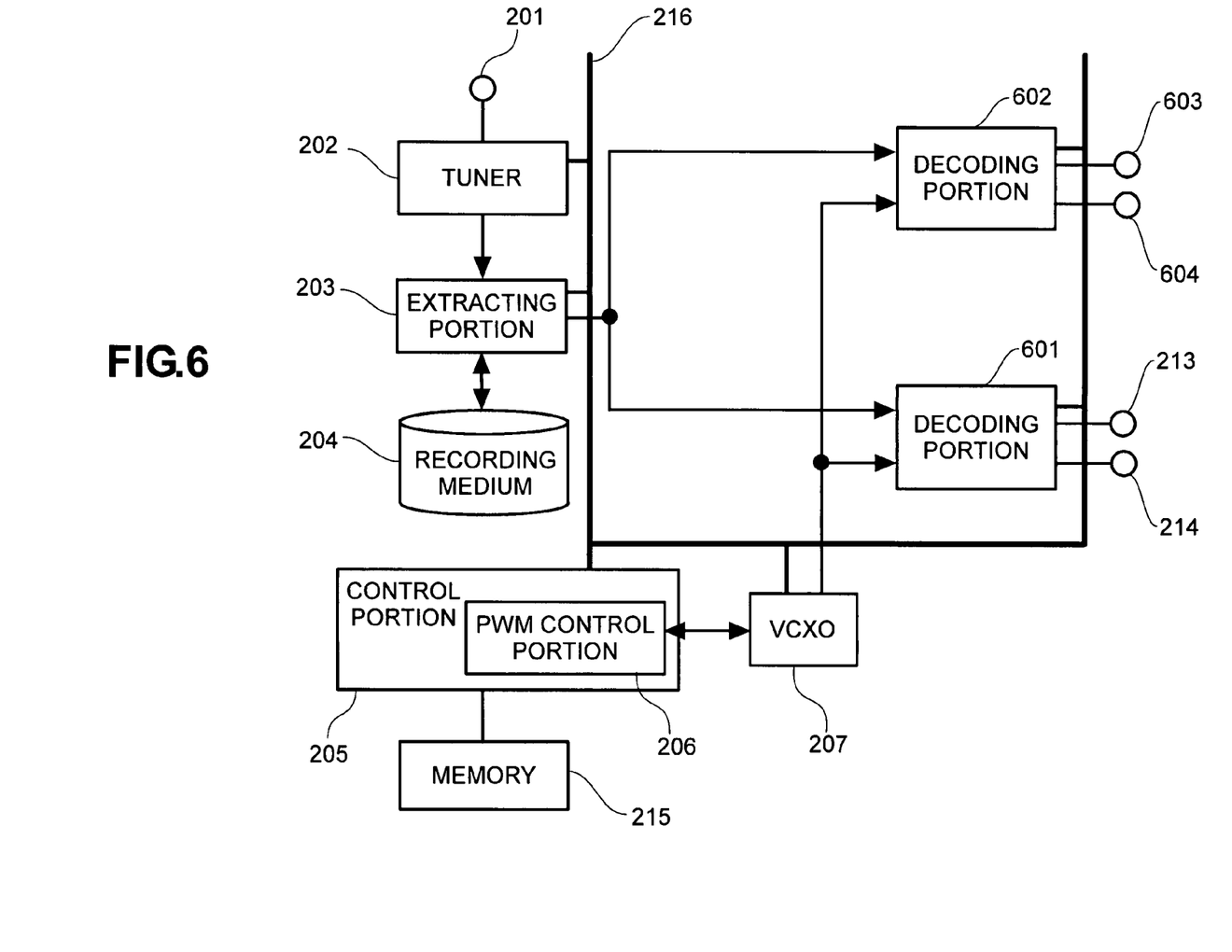
FIG. 6 is a functional block diagram of a recording and reproducing apparatus including a plurality of decoding portions, according to a third embodiment of the invention.

Referring now to FIG. 6, there will be described a digital broadcasting program recording and reproducing apparatus according to a third embodiment of the invention, that is obtained by modifying the digital broadcasting program recording and reproducing apparatus of the first embodiment shown in FIG. 2 such that a portion from the PCR obtaining portion 208 to the audio signal decoding portion 212 is simplified into a decoding portion 601, and there are added a decoding portion 602 having the same structure as the decoding portion 601, an output terminal 603 to which the decoding portion 602 outputs video signals as decoded, and an output terminal 604 to which the decoding portion 602 outputs audio signals as decoded.

Figure 7:
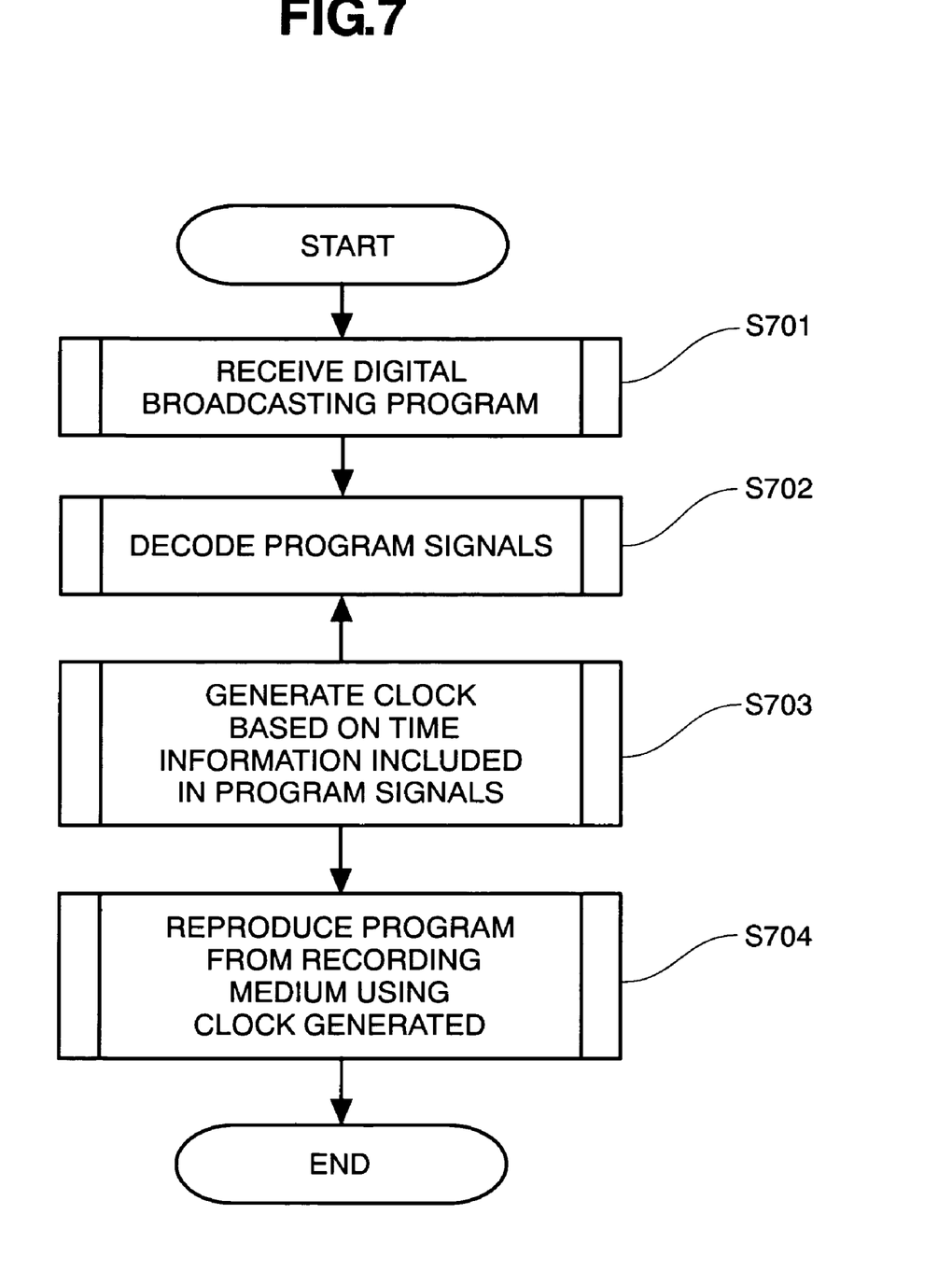
FIG. 7 is a flowchart an example of a way of obtaining a value of a control variable that makes a STC counter to stably operate at a frequency within a range defined by the MPEG-2 standard, according to the third embodiment.

FIG. 7 illustrates a procedure of generating a stable clock upon reproduction a program from a recoding medium 204 in this apparatus.

A flow of the procedure is initiated with step S701 in which a program of a channel that is the same as that of the program to be reproduced from the recoding medium 204 is received by a tuner 201, and the flow goes to step S702.

In step S702, signals from the tuner 201 are decoded by the decoding portion 602, and the flow goes to step S703.

In step S703, a control portion 205 operates to perform a PWM control using PCR and a count of a SCT counter received from the decoding portion 602. A signal of a VCXO 207 thus obtained is inputted into the decoding portion 601 and the decoding portion 602, and the flow goes to step S704.

In step S704, the decoding portion 601 reproduces the program from the recording medium 204 using the clock signal obtained in step S703.

By the above-described operation, reproduction from the recording medium 204 with a stable clock recovery is enabled, in the same way as in the case where the value of the control variable is recorded in the memory or others.

Each of the above-described embodiments is applicable to any apparatus using various recording media, as long as the apparatus receives a digital broadcasting program and records and reproduces the program, such as of HDD, DVD, and Blu-ray Disk. In the above description, each embodiment has been described with respect to the MPEG2-TS format, but the invention is applicable to any system where a reference value for clock generation is periodically transferred.

What is claimed is:

1. A recording and reproducing apparatus comprising:
a receiving portion that receives broadcast data;
an extracting portion that extracts video data, audio data, and time information from the broadcast data;
a counting portion that generates system time information from the time information;
a clock generating portion that generates a clock signal in accordance with which the counting portion is operated;
a decoding portion that decodes, using the clock signal generated by the clock generating portion, the video data and the audio data that are extracted by the extracting portion;
a recording portion that records the broadcast data; and
a control portion that operates to record, as needed and in the recording portion, a control variable based on which a frequency of the clock signal generated by the clock generating portion is controlled when the decoding portion decodes the video data and the audio data, and to control the clock generating portion by using the control variable so that the system time information generated by the counting portion synchronizes with the time information as extracted upon reception of the broadcast data.

2. The recording and reproducing apparatus according to claim 1, wherein the control portion instructs to update the control variable as recorded in the recording portion, when the control value can not be recorded in the recording portion as needed.

3. The recording and reproducing apparatus according to claim 2, wherein the control portion instructs to update the control variable recorded in the recording portion, when a signal instructing to update the control variable is inputted.

4. A recording and reproducing apparatus comprising:
a tuner that receives a digital broadcast signal;

an extracting portion that extracts video data, audio data, and time information from the digital broadcast signal;

a counter that generates system time information from the time information;

a clock generating portion that generates a clock signal in accordance with which the counter is operated;

a decoder that decodes, by referencing the system time information generated by the counter, the video data and the audio data that are extracted by the extracting portion;

a recording medium that records the digital broadcast signal;

a control portion that operates to record, as needed and in the recording medium, a control variable based on which a frequency of the clock signal generated by the clock generating portion is controlled when the decoder decodes the video data and the audio data, and to control the clock generating portion by using the control variable so that the system time information generated by the counter synchronizes with the time information as extracted upon reception of the digital broadcast signal.

5. The recording and reproducing apparatus according to claim 4, wherein the control portion operates to control the clock generating portion by using the control variable recorded in the recording medium so that the system time information generated by the counter synchronizes with the time information as extracted upon reception of the digital broadcast signal, when the decoder decodes the digital broadcast signal recorded in the recording medium.

6. A receiving apparatus comprising:

a tuner that receives a digital broadcast signal;

an extracting portion that extracts video data, audio data, and time information from the digital broadcast signal;

a counter that generates system time information from the time information;

a clock generating portion that generates a clock signal in accordance with which the counter is operated;

a decoder that decodes the video data and the audio data that are extracted by the extracting portion;

an encoder that encodes the video data and the audio data as decoded by the decoder, based on the clock signal generated by the clock generating portion; and a control portion that controls the clock generating portion by using a control variable based on which a frequency of the clock signal generated by the clock generating portion is controlled when the decoder decodes the video data and the audio data, so that the system time information generated by the counter synchronizes with the time information extracted upon reception of the digital broadcast signal, the control portion operating to update the control variable as needed.

* * * * *